United States Patent
Kim et al.

(10) Patent No.: US 9,892,829 B2
(45) Date of Patent: Feb. 13, 2018

(54) FUEL SENDER DEVICE FOR VEHICLE

(71) Applicant: Hyundai Motor Company, Seoul (KR)

(72) Inventors: Chang Han Kim, Gwangju (KR); Myeong Hwan Kim, Hwaseong-si (KR); Jae Min Lee, Gongju-si (KR)

(73) Assignee: Hyundai Motor Company, Seoul (KR)

( * ) Notice: Subject to any disclaimer, the term of this patent is extended or adjusted under 35 U.S.C. 154(b) by 410 days.

(21) Appl. No.: 14/570,576

(22) Filed: Dec. 15, 2014

(65) Prior Publication Data

US 2015/0357098 A1    Dec. 10, 2015

(30) Foreign Application Priority Data

Jun. 9, 2014 (KR) .......................... 10-2014-0069145

(51) Int. Cl.
| | | |
|---|---|---|
| *H01C 10/28* | (2006.01) | |
| *H01C 10/32* | (2006.01) | |
| *G01F 23/00* | (2006.01) | |

(52) U.S. Cl.
CPC ............. *H01C 10/28* (2013.01); *H01C 10/32* (2013.01); *G01F 23/00* (2013.01)

(58) Field of Classification Search
CPC ......... H01C 10/28; H01C 10/32; G01F 23/60; G01F 23/32; G01F 23/26
USPC .................................................... 73/317, 313
See application file for complete search history.

(56) References Cited

U.S. PATENT DOCUMENTS

| | | | | |
|---|---|---|---|---|
| 1,585,214 | A * | 5/1926 | Szukalski | H01C 10/28 191/1 R |
| 5,216,919 | A * | 6/1993 | Nelson | G01F 23/36 338/33 |
| 7,343,799 | B2 * | 3/2008 | Nagakura | G01F 23/36 73/290 R |
| 2010/0132456 | A1* | 6/2010 | Lee | G01F 23/36 73/313 |
| 2013/0239677 | A1* | 9/2013 | Takagi | G01F 23/363 73/313 |
| 2015/0300869 | A1* | 10/2015 | Klein | G01F 23/363 73/317 |

FOREIGN PATENT DOCUMENTS

| | | |
|---|---|---|
| JP | 2008-261781 A | 10/2008 |
| KR | 1999-001819 A | 1/1999 |
| KR | 10-2007-0044630 A | 4/2007 |
| KR | 10-2010-0039921 A | 4/2010 |
| KR | 10-2013-0048918 A | 5/2013 |

* cited by examiner

*Primary Examiner* — Lisa Caputo
*Assistant Examiner* — Nathaniel T Woodward
(74) *Attorney, Agent, or Firm* — Morgan, Lewis & Bockius LLP (57) ABSTRACT

A fuel sender device for a vehicle may include a resistance substrate having a conductor part, a contact plate having a contact point contacting the conductor part, and a float unit moving up and down according to a variation of an oil surface and angularly rotating the contact plate, wherein the fuel sender device includes a variable contact point that allows the contact plate to variably contact the conductor part while moving up and down and rotating according to the variation of the oil surface.

4 Claims, 8 Drawing Sheets

FUEL SENDER DEVICE FOR VEHICLE

CROSS-REFERENCE TO RELATED APPLICATION

The present application claims priority to Korean Patent Application No. 10-2014-0069145 filed on Jun. 9, 2014, the entire contents of which is incorporated herein for all purposes by this reference.

BACKGROUND OF THE INVENTION

Field of the Invention

The present invention relates to a fuel sender device for a vehicle. More particularly, the present invention relates to a fuel sender device for a vehicle, which can prevent the abrasion of a conductor part by improving a contact between the conductor part of a resistance substrate for a fuel sender and a contact point of a contact plate from a surface contact structure to a point contact structure.

Description of Related Art

Generally, a fuel sender assembly, which forms one unit with a fuel pump, is installed in a fuel tank for a vehicle as a unit to detect a residual amount of fuel.

When the fuel sender assembly outputs different resistances according to the height of the fuel surface (hereinafter, referred to as "oil surface"), the outputted resistances are transmitted to a controller of a cluster, and a fuel gauge indicates a corresponding fuel amount by a control signal of the controller.

Hereinafter, a typical configuration included in the fuel sender assembly to output fuel sender resistances and an operation flow thereof will be described with reference to FIGS. 7 to 10.

Figure 7:
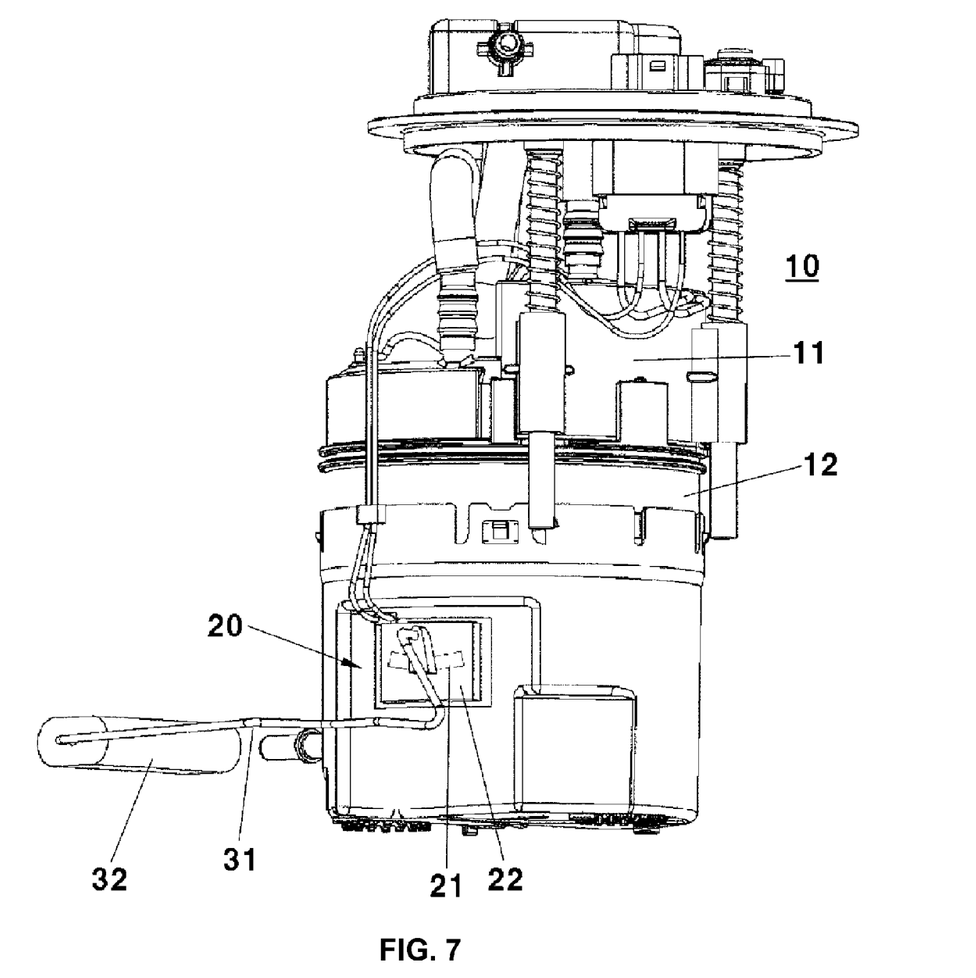
FIG. 7 is a perspective view illustrating a typical fuel sender device for a vehicle.

In FIG. 7, the reference numeral 10 indicates a fuel sender assembly.

The fuel sender assembly 10 includes a fuel pump 11 disposed at an upper part, a variable resistance unit 20 disposed at a lower part, and a float unit connected to the variable resistance unit 20.

Figure 8:
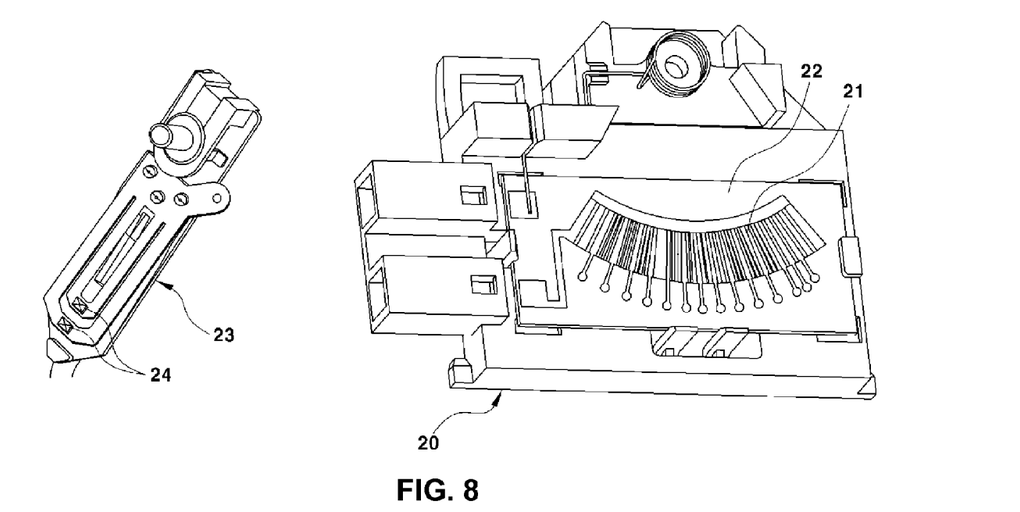
FIG. 8 is a perspective view illustrating a contact plate part and a conductor part of a typical fuel sender device for a vehicle.

Referring to FIG. 8, the variable resistance unit 20 is mounted on the outer surface of the reservoir cup 12 mounted at a lower part of the fuel pump 11. The variable resistance unit 20 includes a resistance substrate 22 having a fan-shaped conductor part 21, and a contact plate 23 conductively contacting the conductor part 21.

In this case, as shown in FIG. 8, a pair of contact points 24 having a square block shape integrally protrudes from an inner surface of a lower end of the contact plate 23.

The float unit includes a float arm 31 connected to the contact plate 23 by a hinge and a float 32 mounted on the end of the float arm 31 and floating on the oil surface.

Accordingly, when the float 32 moves up and down according to the oil surface height of the fuel due to buoyancy, the float arm 31 angularly rotates, allowing the contact plate 23 to rotate by the same angle.

Figure 9:
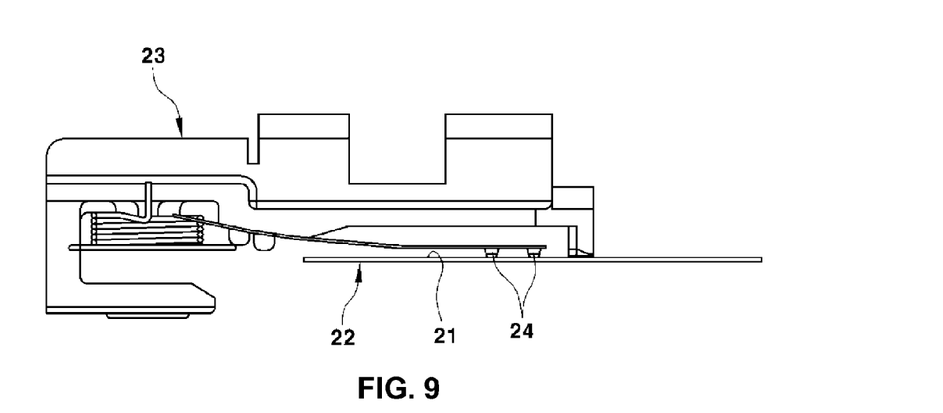
FIG. 9 is a cross-sectional view illustrating a contact plate part and a conductor part of a typical fuel sender device for a vehicle.

When the contact plate 24 angularly rotates, as shown in FIG. 9, the contact point 24 of the contact plate 23 slidably contacts a conductor part along the left and right sides of the conductor part while being in surface contact with the conductor part 21 of the resistance substrate 22.

Thus, as the contact point 24 moves, different variable resistances are outputted from the conductor part 21 of the resistance substrate 22. These resistances are delivered to a controller of a cluster through a cable, allowing a fuel gauge of the cluster to indicate a residual amount of fuel according to a control signal of the controller.

However, the typical fuel sender device has the following limitations.

Since the contact point (square block shape) of the contact plate repeatedly sliding-contacts the conductor part while being in surface contact with the conductor part of the resistance substrate, an abrasion of the contact point and an abrasion of the conductor part severely occur, causing the life-shortening of the fuel sensor and the mis-indication of fuel.

Figure 10:
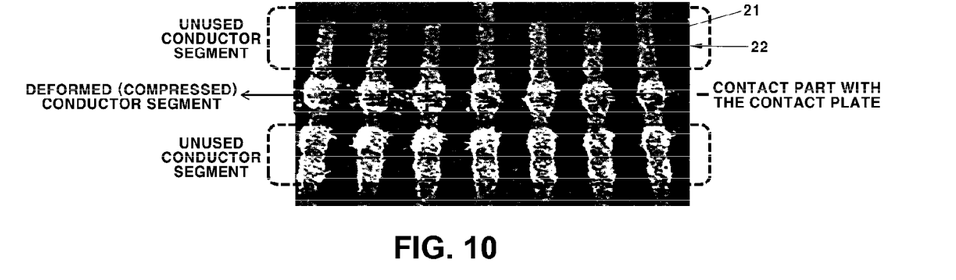
FIG. 10 is a view illustrating an abrasion phenomenon occurring in a typical conductor part.

In other words, as shown in FIG. 10, as the contact point 24 repeatedly contacts the conductor part 21 along a predetermined section (central portion) of the conductor part 21, the contact point 24 is worn out, and the central portion of the conductor part 21 is deformed and worn out because being squashed, causing the life-shortening of the fuel sender and the mis-indication of fuel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel sender device for a vehicle, which can minimize the abrasion of a contact point and a conductor part and extend the lifespan of a fuel sender, by improving the contact point of a contact plate into a vertically movable and rotatable ball-type structure and thus allowing the contact point and the conductor part to become in point (or line) contact with each other.

In one aspect, the present invention provides a fuel sender device for a vehicle, including a resistance substrate including a conductor part, a contact plate including a contact point contacting the conductor part, and a float unit moving up and down according to a variation of an oil surface and angularly rotating the contact plate, wherein the fuel sender device may include a variable contact point that allows the contact plate to variably contact the conductor part while moving up and down and rotating according to the variation of the oil surface.

In an exemplary embodiment, the variable contact point may include a structure that induces a point contact between the contact point and the conductor part.

In another exemplary embodiment, the variable contact point may be a ball-type point that point-contacts the conductor part.

In still another exemplary embodiment, the ball-type point may include a central axis having an upper end and a lower end fixed to an upper part and a lower part of an inner surface of the contact plate, respectively, and disposed in a vertical direction, a spring compressibly inserted into an upper section of the central axis, and a hollow ball inserted into a lower section of the central axis to compress the spring according to a rise of the oil surface.

In yet another exemplary embodiment, the fuel sender device may include a slot in which the spring and the hollow ball in addition to the central axis are disposed in the inner surface of the contact plate along a vertical direction at a predetermined depth, and only a portion of the hollow ball protrudes through the slot so as to be contactable with the conductor part.

In still yet another exemplary embodiment, the fuel sender device may include a stopper disposed at a lower end portion of the contact plate to prevent the hollow ball and the spring from deviating.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings includes reference to the following elements as further discussed below, It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

The present invention focuses on improving a contact point of a contact plate among components of a fuel sender assembly into a vertically movable and rotatable ball-type structure and thus allowing the contact point and a conductor part to variably contact each other.

Figure 1:
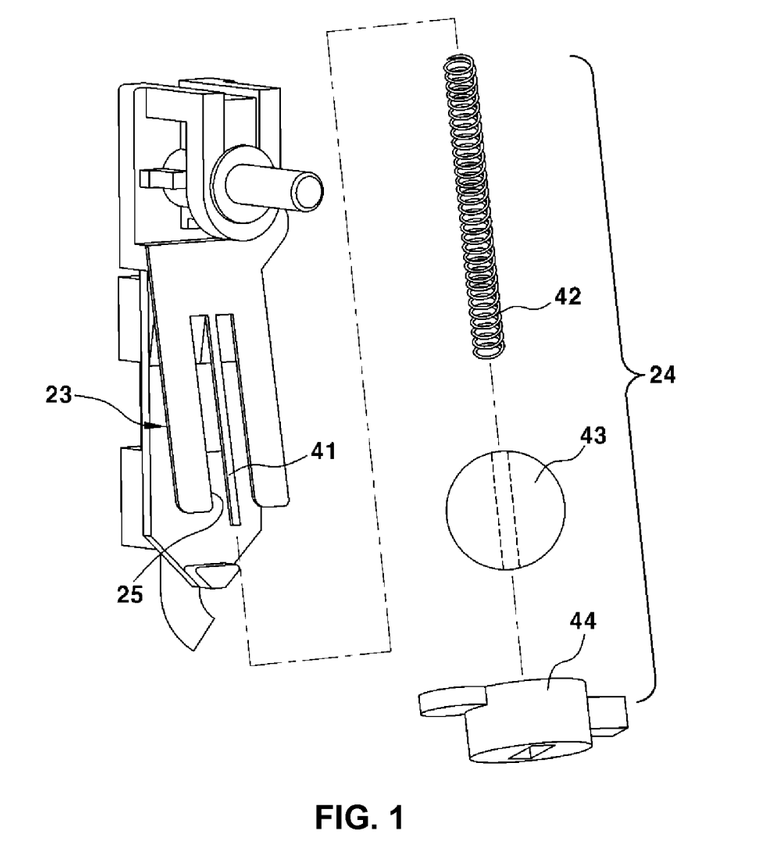
FIG. 1 is an exploded view illustrating a contact plate part of a fuel sender device for a vehicle according to an exemplary embodiment of the present invention.
Figure 2:
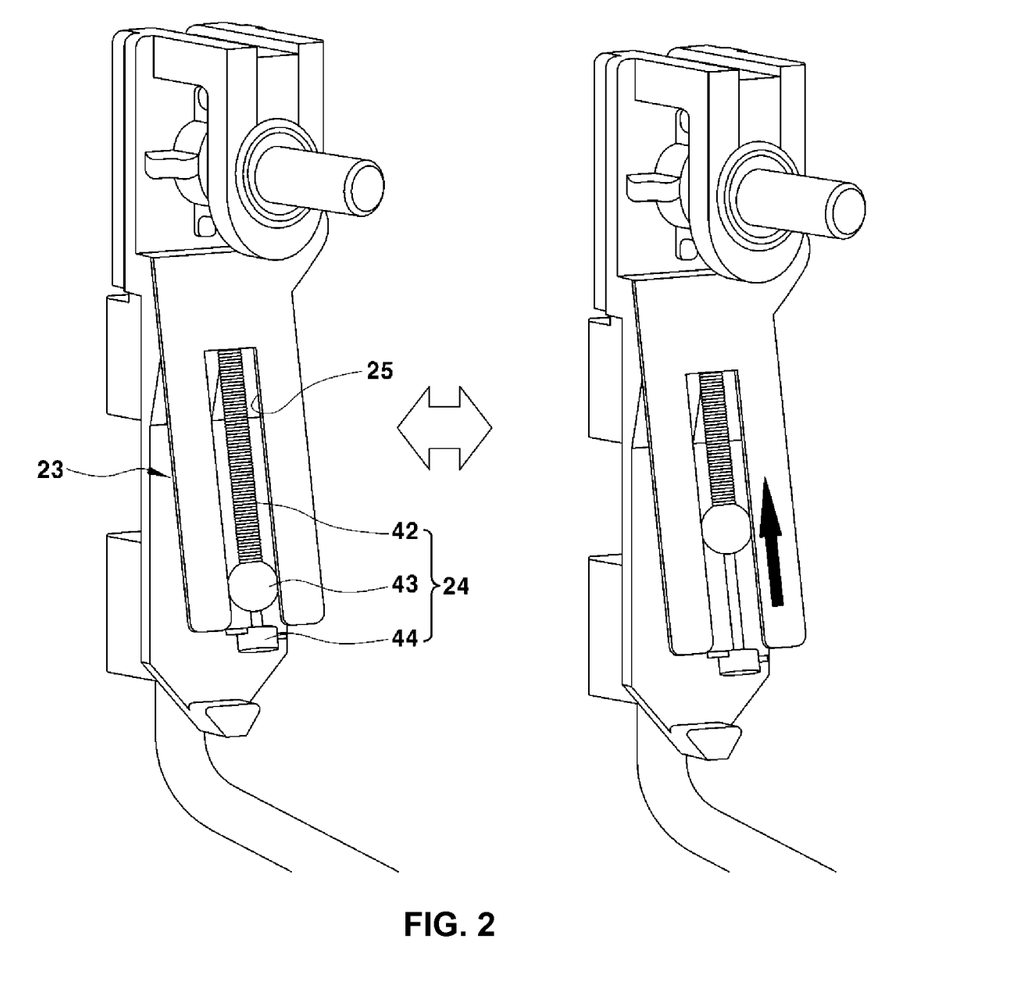
FIG. 2 is an assembly view illustrating a contact plate part of a fuel sender device for a vehicle according to an exemplary embodiment of the present invention.
Figure 3:
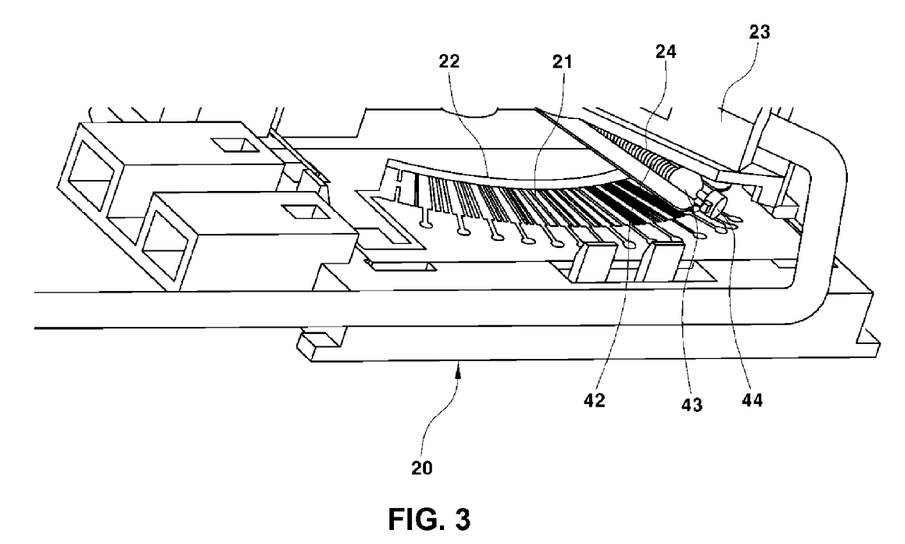
FIG. 3 is a perspective view illustrating a contact plate part of a fuel sender device for a vehicle mounted on a resistance substrate according to an exemplary embodiment of the present invention.
Figure 4:
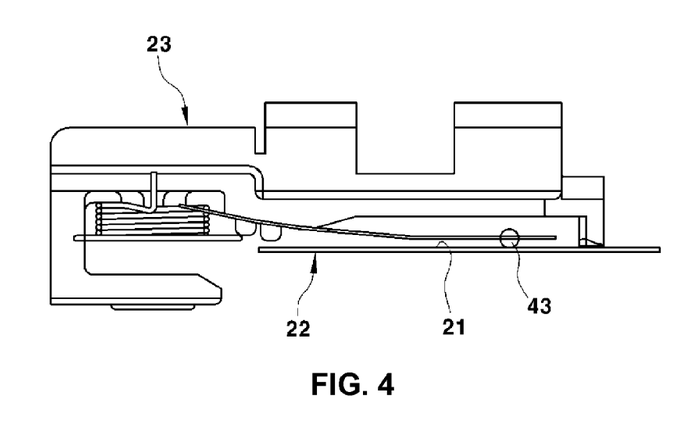
FIG. 4 is a cross-sectional view illustrating a contact plate part of a fuel sender device for a vehicle mounted on a resistance substrate according to an exemplary embodiment of the present invention.

FIG. 1 and FIG. 2 are views illustrating a contact plate part of a fuel sender device for a vehicle according to an exemplary embodiment of the present invention. FIG. 3 and FIG. 4 are views illustrating a contact plate part of a fuel sender device for a vehicle mounted on a resistance substrate according to an exemplary embodiment of the present invention, The fuel sender assembly may include a fuel pump disposed at an upper part, a variable resistance unit disposed at a lower part, and a float unit connected to the variable resistance unit.

As shown in FIG. 3, a variable resistance unit 20 is mounted on the outer surface of the reservoir cup mounted at a lower part of the fuel pump. The variable resistance unit 20 includes a resistance substrate 22 having a fan-shaped conductor part 21, and a contact plate 23 conductively contacting the conductor part 21.

Referring to FIG. 1 and FIG. 2, the contact plate 23 may adopt a variable contact point that variably contacts the conductor part 21 of the resistance substrate while vertically moving and rotating according to the variation of the oil surface.

Particularly, a point contact may be adopted such that the contact plate 23 point-contacts the conductor part 21. In this case, the point contact may be a ball-type point contact.

More specifically, the ball-type point selected as the contact plate 23 may include a central axis 41 having an upper end and a lower end fixed to an upper part and a lower part of the inner surface of the contact plate 23, respectively, and disposed in a vertical direction, a spring 42 compressibly inserted into the upper section of the central axis 41, and a hollow ball 43 inserted into the lower section of the central axis 41 to compress the spring 42 while pushing up the spring 42 according to a rise of the oil surface.

In this case, in order to secure a space for installing the ball-type point in the inner surface of the contact plate 23, a slot 25 in which the spring 42 and the hollow ball 43 in addition to central axis 41 are disposed may be formed in a vertical direction at a certain depth.

The central axis 41 may connect between the upper end and the lower end of the slot 25. The spring 42 and the hollow ball 43 inserted into the central axis 41 may be disposed inside the slot 25, but a portion of the hollow ball 43 may protrude from the slot 25 so as to contact the conductor part 21 of the resistance substrate 22.

Meanwhile, a stopper 44 may be disposed at a lower end portion of the contact plate 23, i.e., a lower end portion of the slot 25, at which the lower end of the central axis is fixed, to prevent the hollow ball 43 and the spring 42 from deviating.

Hereinafter, the operation flow of the fuel sender device will be described as follows.

When there is a change of the oil surface in the fuel tank, as described above, the float 32 may move up and down according to the oil surface height of the fuel due to buoyancy, and the float arm 31 may angularly rotate, allowing the contact plate 23 to rotate by the same angle.

Figure 5:
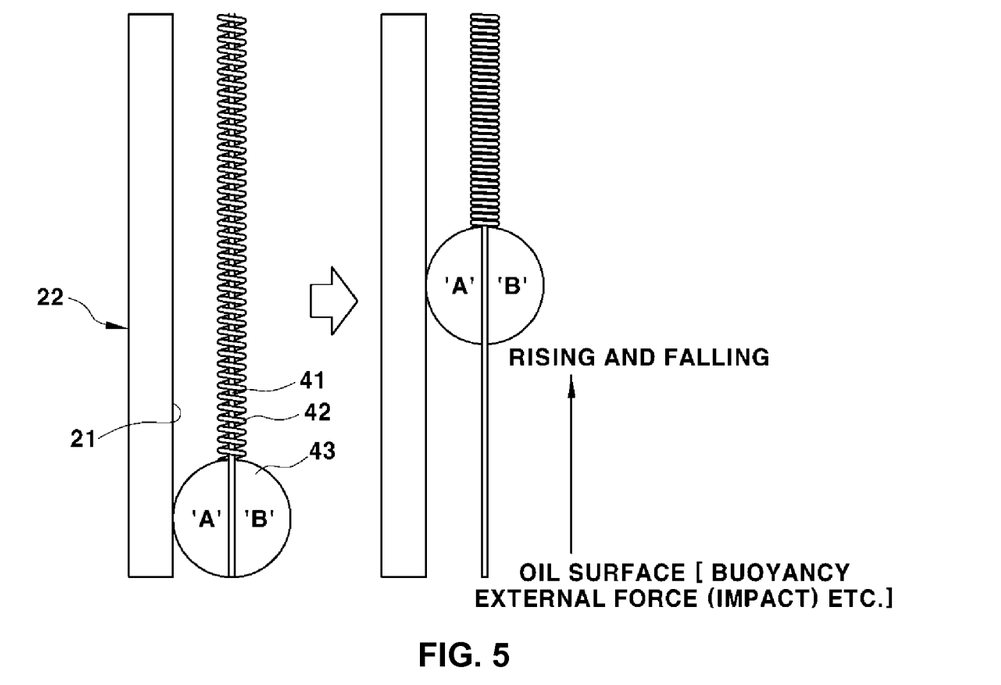
FIG. 5 and FIG. 6 are schematic views illustrating a ball of a contact plate part of a fuel sender device for a vehicle according to an exemplary embodiment of the present invention vertically moving and rotating according to a variation of an oil surface.

Next, when the contact plate 24 angularly rotates, as shown in FIG. 5, the oil surface 43 may move up and down, and simultaneously, may line-contact the conductor part along the left and right side of the conductor part 21 while being in point contact with the conductor part 21.

Figure 6:
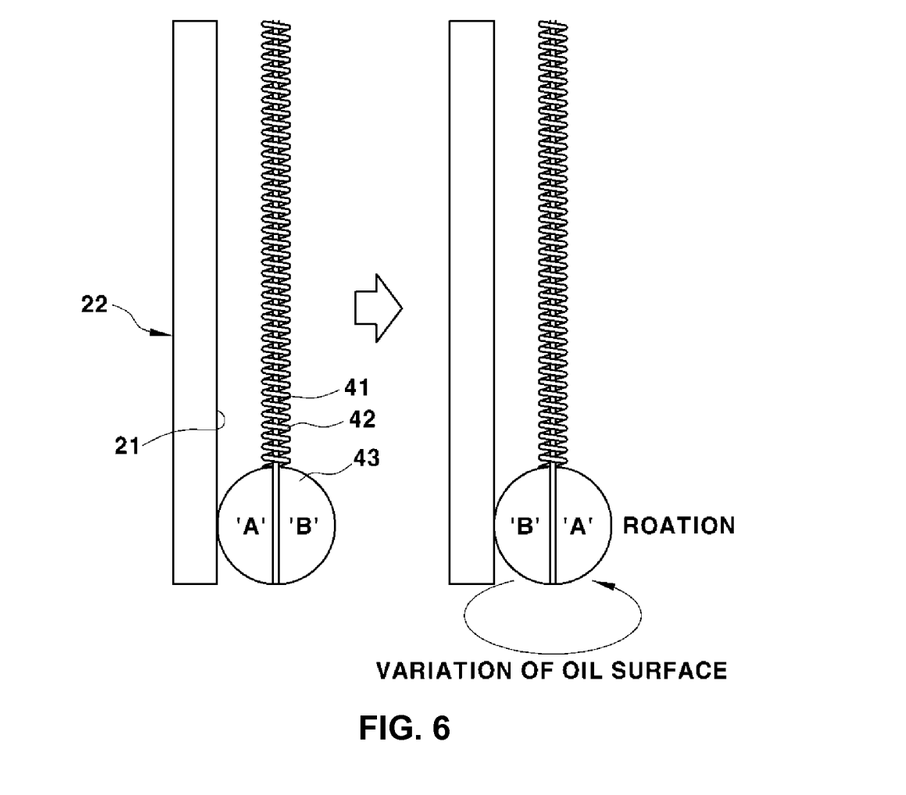

Also, when the contact plate 24 does not angularly rotate but there is a change in the oil surface due to vibration or braking of a vehicle, as shown in FIG. 6, the hollow ball 43 may rotate about the central axis 41 while being in point contact with the conductor part 21.

Accordingly, as the hollow ball 43 moves while being in line contact with the conductor part 21, different variable resistances are outputted from the conductor part 21 of the resistance substrate 22. These resistances are delivered to a controller of a cluster through a cable, allowing a fuel gauge of the cluster to indicate a residual amount of fuel according to a control signal of the controller.

The present invention provides the following effects.

First, a fuel sender device for a vehicle according to an exemplary embodiment of the present invention can minimize the abrasion of a contact point and a conductor part and extend the lifespan of a fuel sender, by improving the contact point of a contact plate into a vertically movable and rotatable ball-type structure and thus allowing the contact point and the conductor part to become in point (or line) contact with each other.

Second, the fuel sender device can extend the lifespan of the fuel sender and prevent the mis-indication phenomenon of a fuel gauge by preventing the abrasion of the contact point and the conductor part.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel sender device for a vehicle, comprising,
   a resistance substrate having a conductor part and a contact plate having a contact point contacting the conductor part;
   a slot disposed in an inner surface of the contact plate; and
   a float unit including the contact point moving up and down through the slot according to a variation of an oil surface and according to an angular rotation of the contact plate,
   wherein only a portion of the float unit protrudes through the slot to be contactable with the conductor part,
   wherein the fuel sender device further comprises a variable contact point that allows the contact plate to variably contact the conductor part while moving up and down and rotating according to the variation of the oil surface,
   wherein the variable contact point is a ball-type point that point-contacts the conductor part,
   wherein the ball-type point comprises,
      a central axis member having an upper end and a lower end fixed to an upper part and a lower part of the slot in the inner surface of the contact plate, respectively, and disposed in a longitudinal direction of the slot;
      a spring inserted into an upper section of the central axis member; and
      a hollow ball inserted into a lower section of the central axis member between the spring and the inner surface of the contact plate and selectively compressing the spring according to a rise of the oil surface.

2. The fuel sender device of claim 1, wherein the variable contact point comprises a structure that induces a point contact between the contact point and the conductor part.

3. The fuel sender device of claim 1, comprising the slot in which the spring and the hollow ball in addition to the central axis member are disposed in the inner surface of the contact plate along the longitudinal direction at the predetermined depth, and only a portion of the hollow ball protrudes through the slot to be contactable with the conductor part.

4. The fuel sender device of claim 1, comprising a stopper disposed at a lower end portion of the contact plate to prevent the hollow ball and the spring from deviating from the contact plate.

* * * * *